Figure 1:
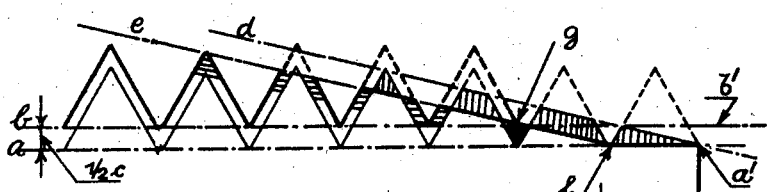

Aug. 30, 1932.   H. STEINRUCK   1,874,378
SCREW TAP
Filed Feb. 7, 1929

Inventor,
Hermann Steinrück
By Henry Orth Jr.
Atty.

Patented Aug. 30, 1932

1,874,378

UNITED STATES PATENT OFFICE

HERMANN STEINRUCK, OF BERLIN, GERMANY

SCREW TAP

Application filed February 7, 1929, Serial No. 338,241, and in Germany February 11, 1928.

If a thread is to be produced within the diameter of the bore without play between the female and male engaging screws, then it is necessary in the case of tapping that the original bore hole should be smaller than the theoretical core dimension. This is necessary, for example, with most pipe connections wherein the bores are frequently only rough-cast. A tap which is made with the correct flank-diameter also at the initially cutting end would not engage at all in the much smaller bores. Such taps are therefore ground at and near the tip to the form of a spiral tap so that the hole is roughed out at the same time as the cutting of the threads. This however gives disadvantageously large bore shavings which may easily tear out the tops of the thread-peaks in the bore. Such holes bored smaller than the core dimension may also be provided with threads by cutting them first of all with a screw tap, the core diameter of which is smaller than the existing bore diameter of the bore-hole. The cutter next used with the larger core diameter then engages readily in the rough-cut groove and deals also with the remaining parts of the material at the top of the screw-thread of the bore. This calls, however, for the production of the thread in two operative steps, and doubles the time of operation. In threads in which the screw tap may be divided, it is certainly possible to arrange these two screw taps one behind the other and combine them to form a so-called stepped screw-tap. The working time of such a stepped tap is naturally rather large. Furthermore it cannot be employed when the depth of the bore hole does not allow of the tap running through the article in which the screw thread is being cut.

According to the present invention a smaller advance cutter is combined with a normally large screw tap in such a fashion that the teeth belonging to the smaller advance cutter first precede alone for a short distance suited to the conditions and just so much that they engage with certainty well in the smaller bore hole; next follow together in free order small and normally large teeth which cut the full amount. For this purpose the novel screw-tap is designed in such a fashion that some tooth-ribs, or even only the first teeth thereof, have a smaller flank diameter while teeth with larger flank diameter are arranged on other tooth-ribs which conform to the diameter of the thread to be cut hereinafter referred to as the normal thread. Preferably a tooth-rib with normal thread is always located between two tooth ribs with smaller thread, the total number of all the tooth-ribs preferably being divisible by two. Naturally this is not absolutely necessary. In certain circumstances it is even possible to provide only one normal cutting rib or even only individual larger teeth offset as desired. The initial cut of this screw tap is so designed that the cutting edges of the advance cutting teeth contact with a conical shell surface concentric with the axis, whilst all the following cutter teeth are bounded by a conical shell surface which is also centrally located but lies within the conical shell of the advance cutting teeth.

The modus operandi is as follows: The advance cutting teeth with smaller flank diameter engage well even in a smaller bore hole since they alone come into operation initially. After a slight depth of the thread groove has been rough cut, the following cutter teeth enter immediately into operation. The latter commence by planing the flanks at the bottom of the thread groove. The alternately arranged narrow advance cutting teeth now cut steadily deeper while the wide teeth follow slowly in the depth. Thus the same effect is achieved as if a large following cutter were preceded by a small advance cutter. Moreover there is the advantage that these screw taps may be designed with very short cut commencing ends, so that they may often furnish even small, bored blind holes with fully cut threads, while there is the advantage of the short working time with "through" holes.

The following cutter ribs are preferably ground off to such an extent forwardly that they commence like a reamer. The cutting action is then as follows. The advance cutter teeth merely cut away the material of the thread groove. The reamer-like end of the following cutter rows reams the bore-hole to the core dimension and the following cutter teeth plane the profile to a finish.

These screw taps are naturally particularly adapted for larger diameters wherewith very many cutting ribs may be provided. In this case the part of the following cutter ribs not cutting at the commencement is best deeply milled away at the front-end of the screw tap in order to create an advantageous shavings space for the advance cutting teeth. If there are only four cutting rows, it is to be recommended that two oppositely located advance cutting rows should be provided, while the part of the following cutting ribs not cutting initially conforms as to their outer diameter as precisely as possible to the bore hole diameter. Said part then undertakes the guidance of the screw tap in the hole axis and ensures that the screw tap does not catch, with the two remaining advance cutter rows, into the material nor the screw vary in profile. In order that these guide ribs shall also not cut the bore askew due to their sharp edges if the screw tap is applied obliquely, these sharp edges may be broken so that such screw taps are guided in centrally of the bore hole axis under all circumstances, even if cutting is commenced obliquely.

Naturally also two and three cutters may be so designed that the cutting rib with the normal teeth is made at the commencement as a guide rib. Even if the bore hole already has the correct dimensions and need not first be cut by the screw tap, the idea of constructing certain cutting ribs as guide ribs may also be employed for the design of screw taps with only one cutting rib. This is of importance with smaller screw taps for the purpose of creating a large space for shavings. If the radius of this guide rib increases slowly then the bore hole may be made less than core dimension. To increase the adherence to the dimension the guide rib may be provided with normal thread in the last threads.

The advance cutting teeth may conform in flank angle to the following cutters; different angles may, however, also be selected. Different angles are of importance particularly in the case of square threads, round threads and so forth. The advance cutting teeth may have the same flank diameter or may be disposed at gradually increasing distances from the axis; also the advance cutting teeth may be designed with gradually decreasing distances from the axis in order that they shall not bind in the advance cut groove.

The present method of producing threads is referred to in the specification only in connection with screw taps; reversed, however, it applies also to tools for the production of external threads, such as cutting files, cutting dies and so forth.

Fig. 1 illustrates the cut profile in diagrammatic representation. This illustration is imagined as if all the rows of teeth of a screw tap were moved in the direction of the thread towards one another in such a fashion that they are combined in one row of teeth. Naturally this is possible only in imagination. All the teeth of the advance cutting portion then lie within the profile of the following cutting row. The line $a\ a'$ represents the line bounding the core of the advance cutting row of teeth while the line $b\ b'$ indicates the line bounding the core of the following cutting teeth. Thus the core diameter of the advance cutting rows is shown smaller than the core diameter of the following cutting rows by the amount $c$. As to the outer diameter the advance cutting teeth are bounded in the initial cutting part by the surface $d, a'$ of a cone while the following cutting teeth are bounded by the surface $e\ f$ of a cone which lies back axially by a distance $f\ a'$ relatively to the conical bounding surface of the advance cutting teeth. The line $b\ b'$, therefore, bounds the core diameter of the finished thread. Due to the smaller advance cutting teeth, which alone cut at the start, this screw tap will still engage in a bore hole which is smaller by the amount $c$ than the theoretical core dimension. The advance cutting teeth cut the central part of the thread groove as indicated by vertical shading while the following cutting teeth plane the flanks as illustrated by horizontal shading. The core material to be peeled off is carried away by the portion $g, f$, constructed like a reamer, of the following cutting rib (cross shading). The part $f\ a'$ of the following cutting tooth-ribs may be designed as a non-cutting guide portion, which is formed advantageously in the case of screw taps with a few rows of teeth only.

Figure 2:
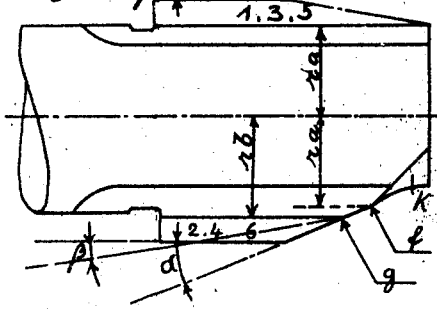
Figure 3:
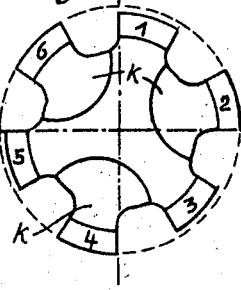

Figs. 2 and 3 illustrate a practical embodiment by way of example of a screw tap with six cutting ribs. Fig. 2 is a section and Fig. 3 is an end view in the direction $h$ of the screw tap according to Fig. 2. The tooth-rows 1, 3 and 5 are the advance cutting rows with a smaller flank diameter. The tooth rows 2, 4 and 6 are the tooth rows with normal teeth. While now the advance cutting tooth-ribs commence at the front end of the screw tap, the increase in the tooth height of the following cutting tooth-ribs only commences at $g$. The part $g\ f$ of the following cutting tooth-ribs is made, in this example like a reamer while portions $k$ of the non-cutting forward part of the said following cutting tooth ribs, from $f$ onwards, are deeply milled off in order to create a better clearing space for the cuttings from the advance cutting teeth. As shown by the example in Fig. 2 the angle of cut $\beta$ of the following cutting tooth ribs may be the same as that of the advance cutting tooth ribs. The angle may, however, also be made larger, as for instance the angle $\alpha$ or smaller. The advance cutting tooth ribs 1, 3 and 5 consequently rough cut the hole of the bore smaller than the theoretical core dimension, the reamer-like section $gf$ of the following cutting tooth-ribs cuts out the core peaks and the other following cutting teeth then alternating with the advance cutting teeth finish the profile of the thread. By this manner of working the smaller screw tap necessary with smaller bore-holes at the same time as a normally large screw tap, half of the working time is saved, as compared with the arrangement in series with a stepped screw tap a considerable saving of initial cutting length is achieved.

Figure 4:
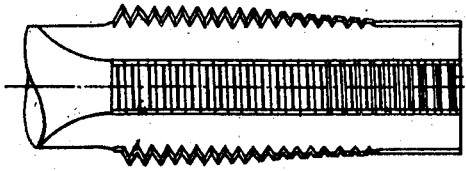
Figure 5:
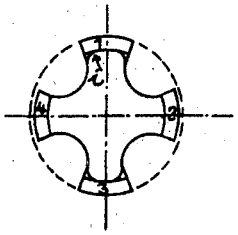

Figs. 4 and 5 illustrate the example of a screw tap with four ribs of cutting teeth of which 1 and 3 are the finishing cutting tooth ribs and 2 and 4 the initial cutting tooth ribs.

The initial cutting tooth-ribs commence at the tip of the screw tap. The following cutting tooth-ribs are set back from the top. The front part of the latter is constructed as a guide rib which may be rounded at $i$ in order to guide more easily.

The action is then the same as with the screw tap of Figs. 2 and 3. With this screw tap also it is generally preferable for the advance cutting tooth-ribs 2 and 4 to enlarge gradually in flank diameter. The advance cutting tooth-ribs 2 and 4 may also be extended by a short amount in order to obtain guide ribs of the diameter of the guide ribs of the following cutting ribs.

I claim:

1. A screw cutting tool comprising advance cutters and finishing cutters formed on different core diameters, the leading end of the tool having advance cutters only and the intermediate portion having advance cutters and finishing cutters which are mutilated so that their cutting edges are bounded by lines which will generate cones in a revolution, the cone of the advance cutters being displaced axially relatively to the cone of the finishing cutters.

2. A screw cutting tool comprising a plurality of cutter rubs certain of said ribs having advance cutters and the remainder having finishing cutters, the respective cutters being formed on different core diameters, the advance cutters only extending to the leading end of the tool, said advance cutters and finishing cutters being mutilated in the intermediate portion between the leading and rear end portions of the tool so that their cutting edges are bounded by lines which will generate cones in a revolution, the cone of the advance cutters being displaced axially relatively to the cone of the finishing cutters.

3. Screw cutting tool comprising advance cutter teeth and finishing cutter teeth of similar formation and depth, these respective cutter teeth being formed on cores of different diameter the core diameter of the advance cutter teeth increasing from the leading end rearwardly so that the advance cutter teeth are disposed at gradually increasing distances from the axis, the edges of mutilated finishing cutter teeth in an intermediate portion of the tool being contained in a cone which lies back from the leading end of the tool and is rearwardly spaced from a cone containing the edges of mutilated advance cutter teeth which alone extend over said intermediate and leading end portions.

4. A screw cutting tool comprising a plurality of cutter ribs certain of the said ribs having advance cutters and the remainder having finishing cutters, the respective cutters being formed on different core diameters, the leading end of the tool having advance cutters only, said advance cutters and finishing cutters being mutilated in the intermediate portions between the leading and rear end portions of the tool so that their cutting edges are bounded by lines which will generate cones in a revolution, the cone of the advance cutters being displaced axially relatively to the cone of the finishing cutters, the finishing teeth ribs being formed as reamers at a point immediately behind the first advance teeth.

5. A screw cutting tool comprising a plurality of cutter ribs certain of the said ribs having advance cutters and the remainder having finishing cutters, the respective cutters being formed on different core diameters, the leading end of the tool having advance cutters only, said advance cutters and finishing cutters being mutilated in the intermediate portions between the leading and rear end portions of the tool so that their cutting edges are bounded by lines which will generate cones in a revolution, the cone of the advance cutters being displaced axially relatively to the cone of the finishing cutters, tool guiding means being formed by the non-cutting end portions of finishing cutter ribs, corresponding end portions of advanced cutter ribs being effective for initial cutting.

6. A screw cutting tool comprising a plurality of cutter ribs certain of the said ribs having advance cutters and the remainder having finishing cutters, the respective cutters being formed on different core diameters, the leading end of the tool having advance cutters only, said advance cutters and finishing cutters being mutilated in the intermediate portions between the leading and rear end portions of the tool so that their cutting edges are bounded by lines which will generate cones in a revolution, the cone of the advance cutters being displaced axially relatively to the cone of the finishing cutters, clearing space for cuttings from the advance cutting teeth being provided by deeply milled off portions of the non-cutting forward part of the ribs of the finishing cutters.

HERMANN STEINRUCK.